(12) United States Patent
Lin et al.

(10) Patent No.: US 8,113,521 B2
(45) Date of Patent: Feb. 14, 2012

(54) INTELLIGENT ELECTRONIC AIR SUSPENSION SYSTEM THAT AUTOMATICALLY ADJUSTS ITS AIR PRESSURE

(75) Inventors: Masa Lin, Xiushui Township, Changhua County (TW); San-Shan Hung, Taichung (TW); Mong-Chi Yang, Xinzhuang (TW)

(73) Assignee: Pin Hsiu Rubber Co., Ltd., Chang-Hua (TW)

( * ) Notice: Subject to any disclaimer, the term of this patent is extended or adjusted under 35 U.S.C. 154(b) by 461 days.

(21) Appl. No.: 12/488,508

(22) Filed: Jun. 19, 2009

(65) Prior Publication Data
US 2010/0320703 A1 Dec. 23, 2010

(51) Int. Cl.
*B60G 17/018* (2006.01)
(52) U.S. Cl. .................. 280/5.507; 701/37; 280/5.514; 280/6.157
(58) Field of Classification Search ............... 280/5.507, 280/5.517, 5.519, 6.157, 124.102; 701/37, 701/38
See application file for complete search history.

(56) References Cited

U.S. PATENT DOCUMENTS

| | | | | |
|---|---|---|---|---|
| 4,647,069 A | * | 3/1987 | Iijima | 280/5.514 |
| 4,949,262 A | * | 8/1990 | Buma et al. | 701/37 |
| 6,098,994 A | * | 8/2000 | Kunishima et al. | 280/5.514 |
| 7,287,760 B1 | * | 10/2007 | Quick et al. | 280/5.512 |
| 7,349,776 B2 | * | 3/2008 | Spillane et al. | 701/36 |

* cited by examiner

*Primary Examiner* — Paul N Dickson
*Assistant Examiner* — Timothy Wilhelm
(74) *Attorney, Agent, or Firm* — Wang Law Firm, Inc.; Li K. Wang

(57) ABSTRACT

An intelligent electronic air suspension system that automatically adjusts its air pressure includes a vehicle speed detector, a vehicle height detector, a level detector, a first pressure sensor, a control end, and four air struts on the vehicle suspension system. The data of the vehicle speed detector, the vehicle height detector, the level detector, and the first pressure sensor are integrated to obtain the dynamical condition of the moving vehicle and its position on the road. Such information is transmitted to the control end and displayed on the monitor end at the same time. According to needs, the user can set manual or automatic control to adjust the air struts so that passengers in the vehicle enjoy more comfort. The air struts can also be adjusted according to the driver's habits to have better controllability. Moreover, the vehicle height can be adjusted according to its load, ensuring the safety of both passengers and cargo.

10 Claims, 9 Drawing Sheets

INTELLIGENT ELECTRONIC AIR SUSPENSION SYSTEM THAT AUTOMATICALLY ADJUSTS ITS AIR PRESSURE

BACKGROUND OF THE INVENTION

1. Field of Invention

The invention relates to an intelligent electronic air suspension system that automatically adjusts its air pressure and, in particular, to a system that can immediately and actively adjust the settings of the air shock absorber of the vehicle according to the user's needs.

2. Related Art

The suspension system effectively provides cushion and reduces vibrations for a moving vehicle to avoid violent jitters. Simply put, the suspension system is a structure between a vehicle body and its tires. In addition to supporting the vehicle, it also provides passengers with better comfort. Traditional suspension systems include passive suspension and mechanical suspension. They usually consist of springs, shock absorbers, links, control arms, and stabilizer bars. The primary function of a suspension system is to support the vehicle body, frame, passengers, and cargos. It absorbs vibrations as the vehicles runs on an uneven road, thereby reducing direct damages to the vehicle structure. The vibrational energy transferred to the vehicle body is reduced to an extent that passengers feel comfortable.

Currently, most vehicle suspension systems use spiral springs as the buffering elements. They have been used for quite a long time in the vehicle industry. They indeed can achieve the basic shock absorbing effect.

However, further analysis of the spiral spring details that the elastic supporting range of it has been fixed in the beginning. There is no way to adjust it during usage. Please refer to ROC Pat. No. M251958. It proposes an adjustable damping device. Its damping parameter (C|T), where C is the pressing side and T is pulling side, enables the user to adjust according to needs (vehicle and road conditions).

The common spiral spring shock absorbers with adjustable damping parameters include a traditional spring and a damper. The spring has a fixed spring constant K, and the damper has a damping parameter C/T, where C is the pressing side and T is the pulling side. However, the combination of an adjustable damping value C|T and a fixed spring constant K in the prior art does not have significant effects.

Although the above-mentioned spiral spring shock absorber with an adjustable damping parameter already roughly solves problems in conventional shock absorbers. However, it can only slightly improve the comfort and controllability by adjusting the damping parameter. It cannot make changes and adjustments to the dynamical level and height of the vehicle.

In other words, when a vehicle goes uphill/downhill, carries weights, suddenly accelerates/decelerates, or encounters a concave/convex road surface, the tires have different extents of sinking or floating relative to the vehicle body. The above-mentioned spiral spring shock absorber with an adjustable damping parameter cannot completely deal with such situations. The driver or passengers inside the vehicle would feel uncomfortable. Therefore, they will cause damages to the vehicle body in the long run. Besides, for a truck with a heavy load, uneven weights may tilt the vehicle body. Moreover, the shock absorber is depressed for a long time. This will shorten the lifetime of the shock absorber.

Moreover, there are shock absorbers made using air springs as the buffering elements. For example, U.S. Pat. No. 7,420,462 "AIR SPRING DISTANCE INDICATING SYSTEM AND METHOD" and U.S. Pat. No. 7,331,571 "INTEGRATED SOLENOID VALVE AND AIR STRUT ASSEMBLY" disclose the technique of using air springs in a vehicle system. Nevertheless, they still have inconvenience in practice. That is, they cannot perform real-time detections for all sorts of road conditions as the vehicle moves and make the corresponding adjustments at the same time.

Overall, the above-mentioned prior art does not provide active adjustments for various kinds of road and vehicle conditions. It is thus desirable to have more improvements.

SUMMARY OF THE INVENTION

An objective of the invention is to provide an intelligent electronic air suspension system that automatically adjusts its air pressure. Using air struts, vehicle speed detector, vehicle height detector, pressure sensor, and level sensor on the vehicle, current vehicle and road conditions can be detected and obtained. A control end and a monitor end perform active adjustments in immediately. They set to inflate or deflate air struts to provide more comfort for passengers. Of course, the invention can also achieve good effects in controllability, safety, and ability in escaping from dangers.

Another objective of the invention is to allow the user to manually control the inflation or deflation of the air struts through the monitor end. As a result, the air struts conform better with the habits and requirements of the driver, rendering better controllability.

Yet another objective of the invention is to provide a wireless radio frequency (RF) transmission mode between the control end and the monitor end, thereby enhancing convenience thereof.

A further objective of the invention is to provide the function of using a Bluetooth mobile phone to control the control end with Bluetooth transmission function. This achieves the goal of inflating and deflating air springs.

To achieve the above-mentioned objectives, the invention includes four air struts, one air compressor, one electromagnetic (EM) valve assembly, one control end, at least one vehicle speed detector, at least one vehicle height detector, and one monitor end.

The four air struts are installed at the suspension systems in the left front, right front, left rear, and right rear of the vehicle. The air compressor is disposed in the vehicle and connected with an air storage tank.

The EM valve assembly is disposed in the vehicle. It includes first, second, third, and fourth EM valves, each of which has an in vale and an out valve. The first, second, third, and fourth EM valves perform inflation and deflation between the air storage tank and the four air struts. Each of them is equipped with a first pressure sensor in fluid communications with the corresponding air strut for detecting its pressure.

The control end electrically connects to the EM valve assembly. It includes a first micro controller and a first data transmission unit. The first control end electrically connects to the first pressure sensors.

The vehicle speed detectors are disposed in the vehicle and electrically connected with the control end for detecting the moving speed of the vehicle. The vehicle height sensors are disposed in the vehicle and electrically connected with the control end for detecting the height of the vehicle.

The monitor end includes a second micro controller, several buttons, a second data transmission unit, and a display. The buttons are used to adjust the corresponding air struts in the left front, right front, left rear, and right rear. There are signal transmitting between the second data transmission unit and the first data transmission unit.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

Figure 1:
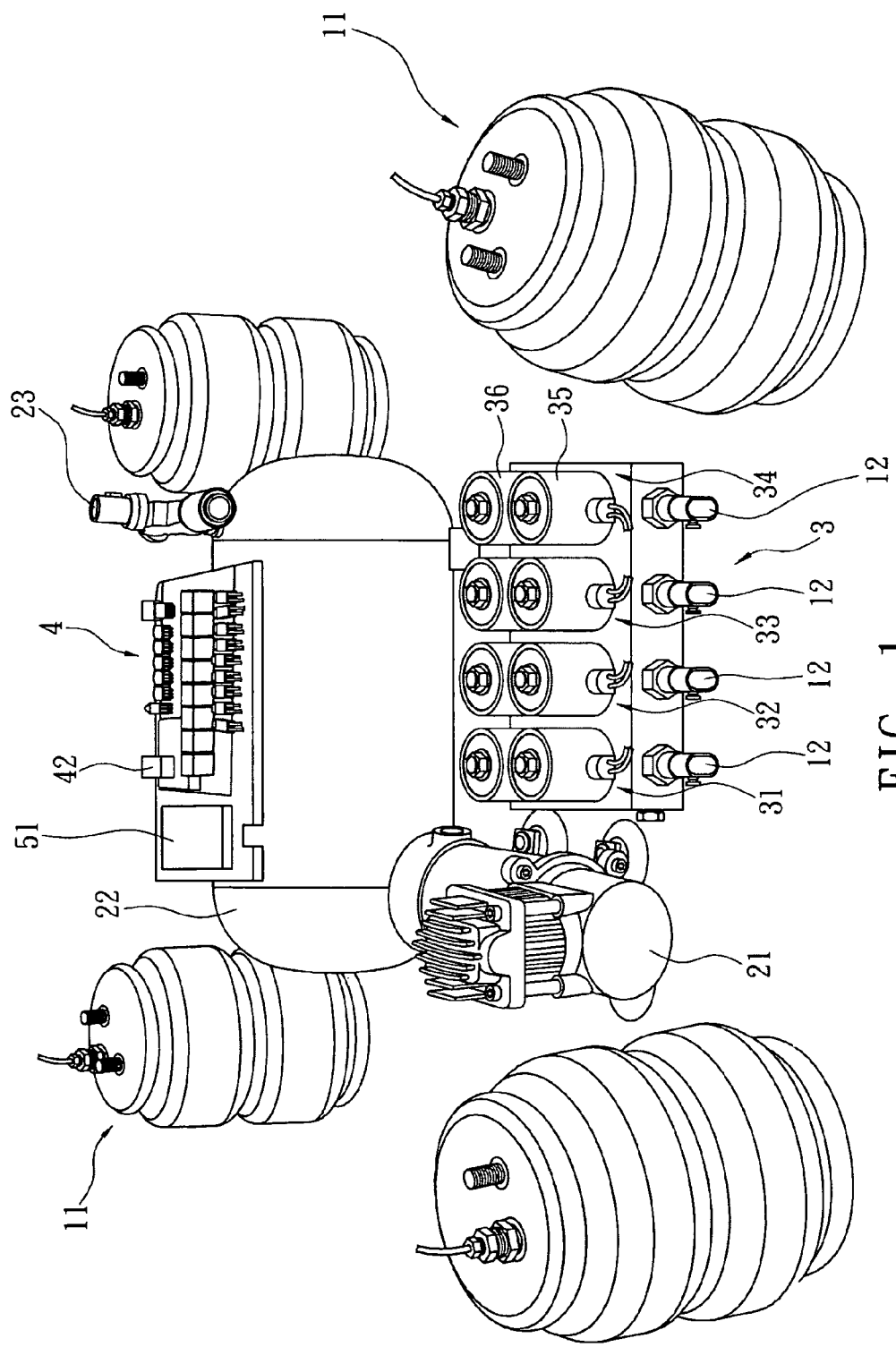
FIG. 1 is a schematic view of the test platform for the disclosed system.
Figure 2:
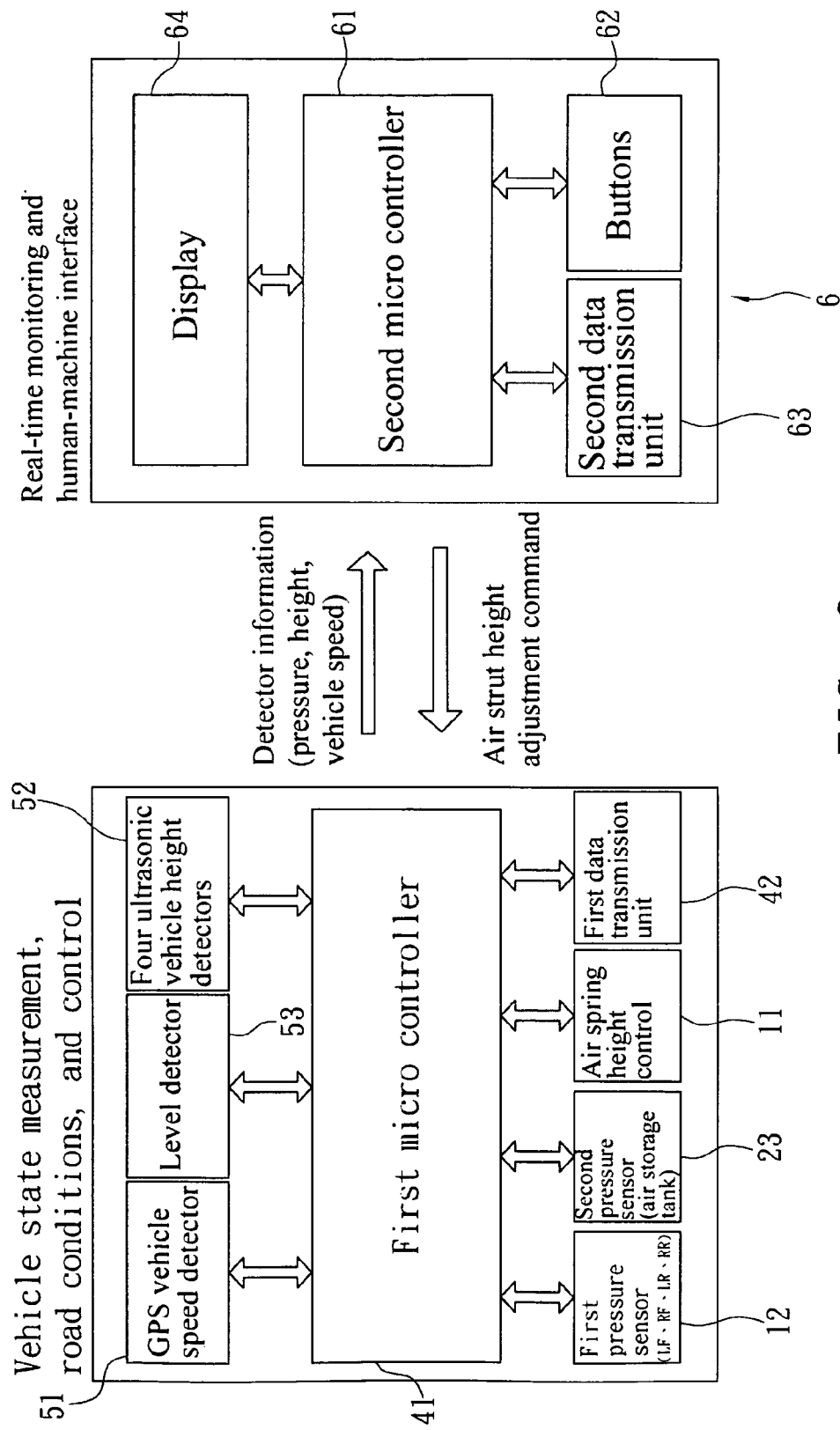
FIG. 2 shows the structure of the disclosed system.

The present invention will be apparent from the following detailed description, which proceeds with reference to the accompanying drawings, wherein the same references relate to the same elements.

Please refer to FIGS. 1 through 4 for an embodiment of the disclosed intelligent electronic air suspension system that automatically adjusts its air pressure. It includes four air struts 11, one air compressor 21, one EM valve assembly 3, one control end 4, at least one vehicle speed detector 51, at least one vehicle height detector 52, at least one level detector 53, and one monitor end 6.

The four air struts 11 are disposed at the suspension systems in the left front, right front, left rear, and right rear of the vehicle. In this embodiment, this type of air struts 11 is made of rubber spring and shock absorber. The air strut here is of the bellow type, as shown in FIG. 1. The area under pressure is large in comparison with its displacement. It has better sustainability. Of course, in practice, the invention is not limited to bellow-type air springs. Other types of air springs can be used according to their purposes.

The air compressor 21 is disposed in the vehicle and in fluid communications with an air storage tank 22. The air storage tank 22 has a second pressure sensor 23 for measuring the pressure of air therein.

The EM valve assembly 3 is disposed in the vehicle and includes a first EM valve 31, a second EM valve 32, a third EM valve 33, and a fourth EM valve 34. Each of them has one in valve 35 and one out valve 36. The first EM valve 31, the second EM valve 32, the third EM valve 33, and the fourth valve 34 enable inflation and deflation between the air storage rank 22 and the fourth air struts 11.

Besides, each of the first EM valve 31, the second EM valve 32, the third EM valve 33, and the fourth valve 34 is equipped with a first pressure sensor 12. Each of the first pressure sensors 12 is in fluid communications with the corresponding air strut 11 for measuring the pressure therein.

Please refer to FIG. 1. In this embodiment, the in valve 35 and the out valve 36 of each of the first EM valve 31, the second EM valve 32, the third EM valve 33, and the fourth valve 34 are disposed in the front and back. They are connected to the corresponding air struts 11 and the air storage tank 22 via air ducts.

The control end 4 electrically connects with the EM valve assembly 3. It includes a first micro controller 41, such as the 8051 chip with built-in analog-to-digital converter (ADC), oscillator, SPI interface, and UART transmission interface. The first control end 41 further electrically connects to each of the first pressure sensors 12 for receiving air pressure data of the fourth air struts 11. Besides, the first micro controller 41 of the control end 4 also receives the air pressure data transmitted from the second pressure sensor 23 of the air storage tank 22. Moreover, the control end 4 further electrically connects to a first data transmission unit 42. In practice, the first data transmission unit 42 can be a wireless module, such as an RF module and a Bluetooth module.

The vehicle speed detectors 51 are disposed in the vehicle and electrically connected with the control end 4 for detecting the vehicle speed. The vehicle speed detector 51 adopts the built-in speed measurement function of the global positioning system (GPS). Using the GPS to read the vehicle speed signal is very convenient. It can be applied to various vehicle types. This solves the problem of using different vehicle speed detectors for different vehicle models. In this case, the invention no longer needs EMC signals on the vehicle.

Moreover, the vehicle speed detector 51 can be implemented using a magnetic resistance element (MRE). As a property of the MRE, the magnitude of its resistance varies with the direction of magnetic field lines. As a multi-pole magnet ring rotates, the magnetic field lines change to generate pulse signals. In particular, the multi-pole magnet ring uses a drive gear installed on the gearbox to drive a driven gear on the vehicle speed sensor, thereby obtaining the speed of the vehicle.

The vehicle height detectors 52 are installed in the vehicle and electrically connected with the control end 4 for detecting the height of the vehicle. They are used to maintain vehicle height when the loaded weight on the vehicle changes or the user wants to change the vehicle height. Therefore, the invention uses the vehicle height detectors to detect the suspension displacements.

In this embodiment, the vehicle height sensor 52 is implemented using a non-contact supersonic sensor. Four vehicle height sensors 52 are disposed near the four tires. The supersonic vehicle height sensors detect the vibration of the vehicle in the vertical direction, using the ground surface as the base. It functions by emitting a supersonic wave toward the road surface and detects the reflected wave. It then measures the elapsed time and converts that into the vehicle height. Furthermore, the sensors can be used to detect road conditions in other directions. Of course, the non-contact means also include the use of laser or infrared (IR) light.

Moreover, the vehicle height sensor 52 can be implemented using a contact slide resistor sensor. The vehicle height sensor is usually disposed on the vehicle body. The suspension displacement is converted into rotational motion of a central axis via links and levers. The interior of the vehicle height sensor is a sliding structure composed of a resistor formed on a resin substrate and an electric brush fixed on the central axis. Through the contact of the electric brush, the resistance between terminals varies in proportion with the rotation angle of the central axis. Therefore, by imposing a specific voltage on the resistor, the rotation angle (thus the suspension displacement) can be determined. As mentioned before, the vehicle height sensor 52 can be a resistor meter element or an optical meter element.

Of course, it is more convenient to install non-contact sensors for the vehicle height sensors 52 than contact sensors. The former are also suitable for more vehicle models.

The level detector 53 is disposed in the vehicle and electrically connected with the control end 4 for detecting the level of the vehicle. The detection of side tilt of the vehicle can be achieved by using an acceleration detector that detects transverse and longitudinal accelerations. Such an acceleration detector is also often used to detect vertical accelerations in active or half-active control systems.

In this embodiment, the level detector 53 can be implemented using a piezo resistance sensor or gravity sensor (G-sensor). This embodiment uses a piezo resistance sensor. For the piezo resistance mechanism, a micro machining technique fabricates a suspension arm beam on a silicon wafer, with the beam providing the piezo resistance. Under an acceleration, the suspension arm deforms to produce a variation in resistance. The resistance change is processed by an integrated circuit (IC) to obtain the corresponding acceleration. Thus, the tilting extent can be obtained.

Besides, the above-mentioned level detector 53 can be implemented using an electrostatic capacity sensor. The electrostatic capacity sensor has a sandwich structure of silicon wafer and glass. A movable electrode formed from silicon wafer and fixed electrodes on its both sides form the required capacitor. When there is an acceleration, the suspension arm bends to produce a change in the capacitance of the capacitor. The change in capacitance is processed by the IC to obtain the corresponding acceleration. Thus, the tilting extent can be obtained.

The monitor end 6 includes a second micro controller 61, such as the 8051 chip with built-in ADC, oscillator, SPI interface, and UART transmission interface, several buttons 62, a second data transmission unit 63, and a display 64. The buttons 62 can be used to adjust the air struts in the left front, right front, left rear, and right rear of the vehicle. The second data transmission unit 63 can be a wireless module (e.g., RF module, Bluetooth module, etc). Wireless signals are transmitted between the second data transmission unit 63 and the first data transmission unit 42 in this way. In this embodiment, the monitor end 6 is a handheld device that transmits signals with the control end 4 wirelessly (e.g., RF or Bluetooth). In other words, one can use a Bluetooth mobile phone to control the control end 4 that supports Bluetooth. This facilitates the control and adjustments.

In addition to wireless transmissions, the invention can also use conventional wired transmissions. For example, one can use the Universal Asynchronous Receiver Transmitter (UART) technique between the second data transmission unit 63 and the first data transmission unit 42. Such UART is a commonly used communication interface of microprocessors such as RS-232 and RS-485.

As described above, the invention mainly uses a monitor end to integrate and display all sorts of detection information. The monitor end can control the actions of the air struts and enable them to perform self-adjustments.

In other words, the invention primarily discusses changes of a vehicle in motion. For example, the vehicle height may change according to the vehicle load, vehicle speed, and road conditions so as to keep the suspension system in its optimal state. Another emphasis is in the design of hardware circuits in combination with various sensors. The sensors measure vehicle state parameters to determine the corresponding adjustments.

As shown in FIG. 1, the test platform consists of four air struts 11, one air compressor 21, one air storage tank 22, one EM valve assembly and a power supply. Its purpose is to simulate the four air struts 11 of the vehicle suspension system. It is divided into the control end 4 and the monitor end 6.

Figure 3:
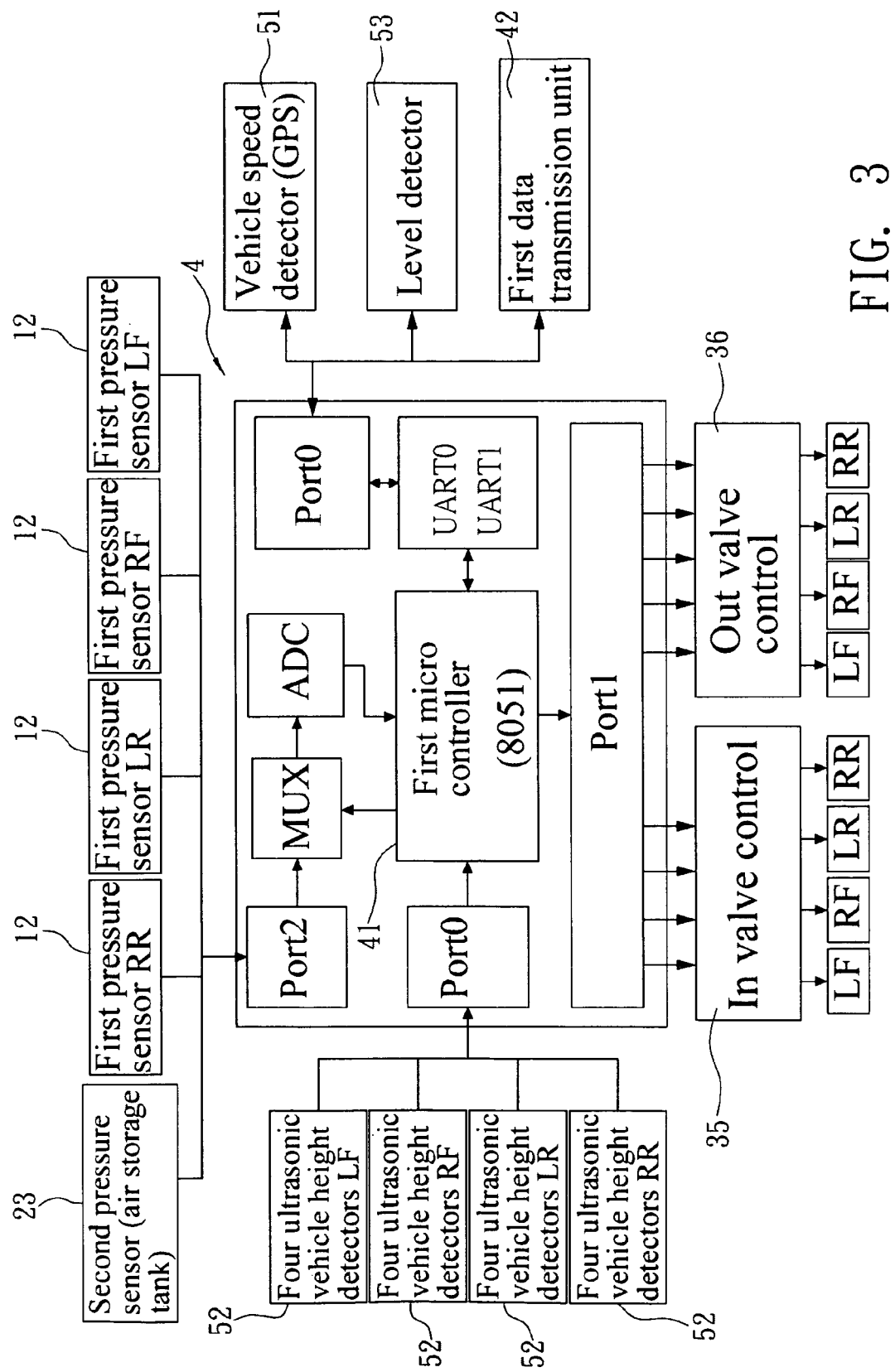
FIG. 3 is a system block diagram of the control end in the invention.
Figure 4:
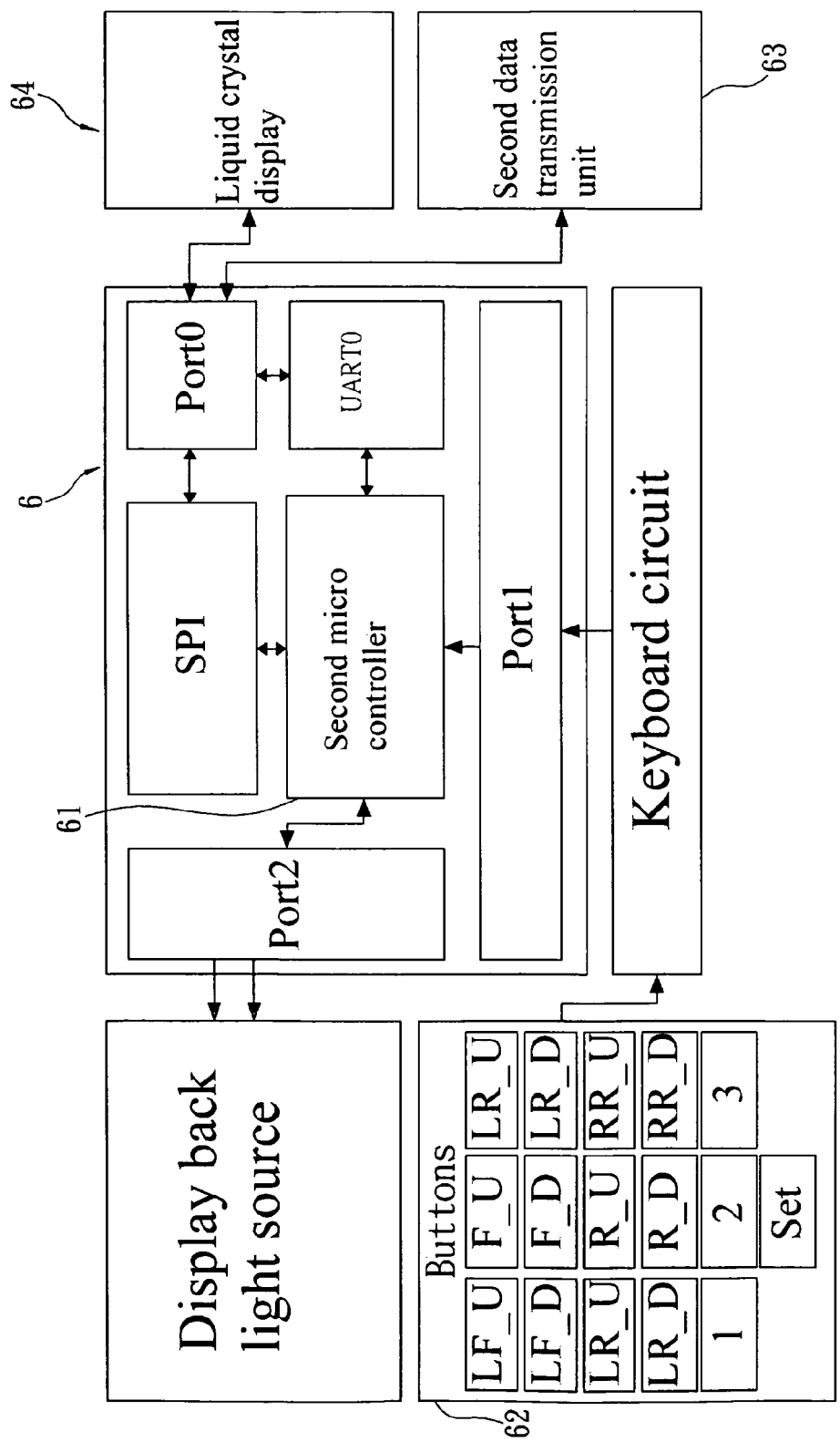
FIG. 4 is a system block diagram of the monitor end in the invention.

FIGS. 3 and 4 are system block diagrams of the control end and the monitor end, respectively. In the drawings, LF, RF, LR, and RR denote the air struts in the left front, right front, left rear, and right rear, respectively. The labels U and D at the air struts LF, RF, LR, and RR in FIG. 4 represent inflation and deflation of the air struts, respectively. Moreover, the system uses the first pressure sensor 12 and the second pressure sensor 23 to detect the interior pressure of the air struts 11 and the air storage tank 22, respectively. The vehicle height detector 52 measures the heights of the air struts. The vehicle speed detector 51 measures the current vehicle speed. The level detector 53 measures the state of the vehicle in motion. These physical quantities are converted into electrical signals, which are then processed by an amplifying circuit to required ranges. The processed electrically signals are then transmitted to the first micro controller 41 for signal processing. The first data transmission unit 42 (serial transmission interface) transfers them to the monitor end 6. The monitor end 6 returns the signals to the control end 4 to control the in valves 35 and the out valves 36 for injecting and releasing compressed air into and out of the air struts 11. This mechanism changes the heights of the air struts 11, thereby controlling the vehicle height.

Figure 5:
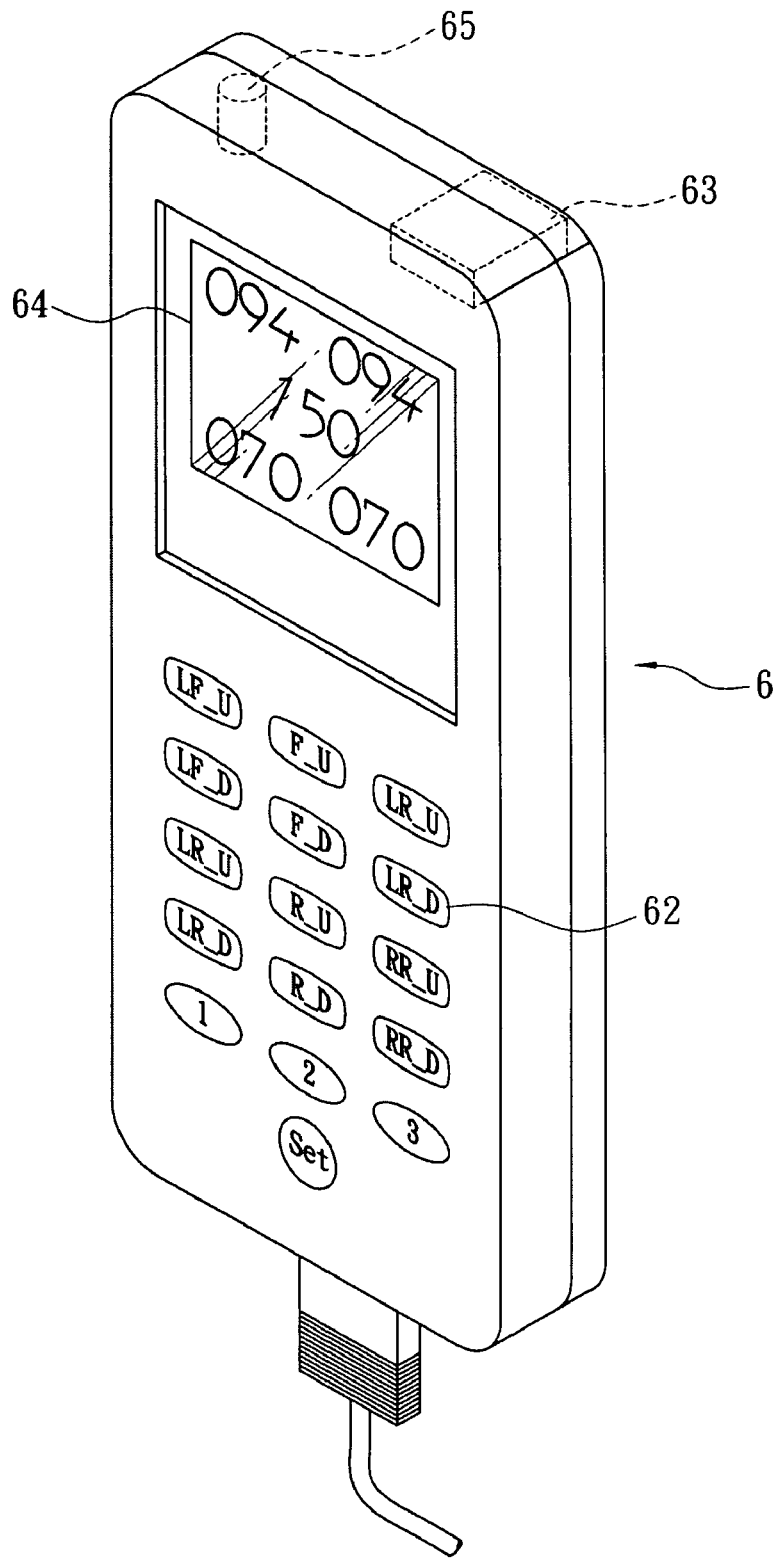
FIG. 5 is a schematic view of a device as the monitor end of the invention.

Please refer to FIG. 5 for an implementation of the monitor end 6. The number 094 on the left and right of the upper part of the display 64 represent the pressure of the two air struts at the left-front and right-front tires, and the number 070 represent the pressure of the two air struts at the left-rear and right-rear tires. This allows the user to observe in real time from the monitor end. Moreover, the user can use the LF, RF, LR, and RR buttons 62 to adjust the air pressure of the corresponding air struts. Besides, it is also possible to simultaneously raise (F_U) and lower (F_D) the two front tires and to simultaneously raise (R_U) and lower (R_D) the two rear tires.

In addition, the monitor end 6 also provides three sets of memory buttons 60 for the user to preset relevant parameters for presumed conditions. They are stored in the memory of the monitor end 6. Therefore, the user can execute them to immediately adjust the air struts 11. Moreover, the monitor end has a wireless antenna 65 equipped with the second data transmission unit 63.

When there are passengers in the back seat of the vehicle, heavy objects in the trunk, and the vehicle is accelerating or decelerating, the suspension system height changes. To maintain a fixed height and avoid the vehicle from tilting or damaging its bottom, the first pressure sensor 12 measures the height change of each air strut 11. The heights of the air struts 11 are automatically adjusted to correct its gesture.

When the vehicle goes uphill or downhill, the tilt may change the heights of the air struts. In this case, the central positions in the front and back of the vehicle can be installed with two level detectors 53. If the measured values are the same as those measured on a flat road, then no change is made to the air struts. When the vehicle speed becomes high as detected by the vehicle speed detector 51, the vehicle height should be reduced for less air resistance and better controllability and stability. Another kind of road condition is that the changes are temporary. Once the vehicle passes the region, there is no effect on the subsequent motion. In this case, a filter can be designed to filter out this signal, and the air struts do not act at all.

Besides, there is a centrifugal force as the vehicle makes a turn. The centrifugal force tilts the vehicle, which renders different sliding friction coefficients between both sides of a tire and the road. This may result in an insufficient turn or too much a turn. Therefore, the level detector can be installed to measure the tilting angle while the vehicle makes the turn. After some calculations, the invention can correct the insufficient or over turn to ensure controllability and safety.

Figure 6:
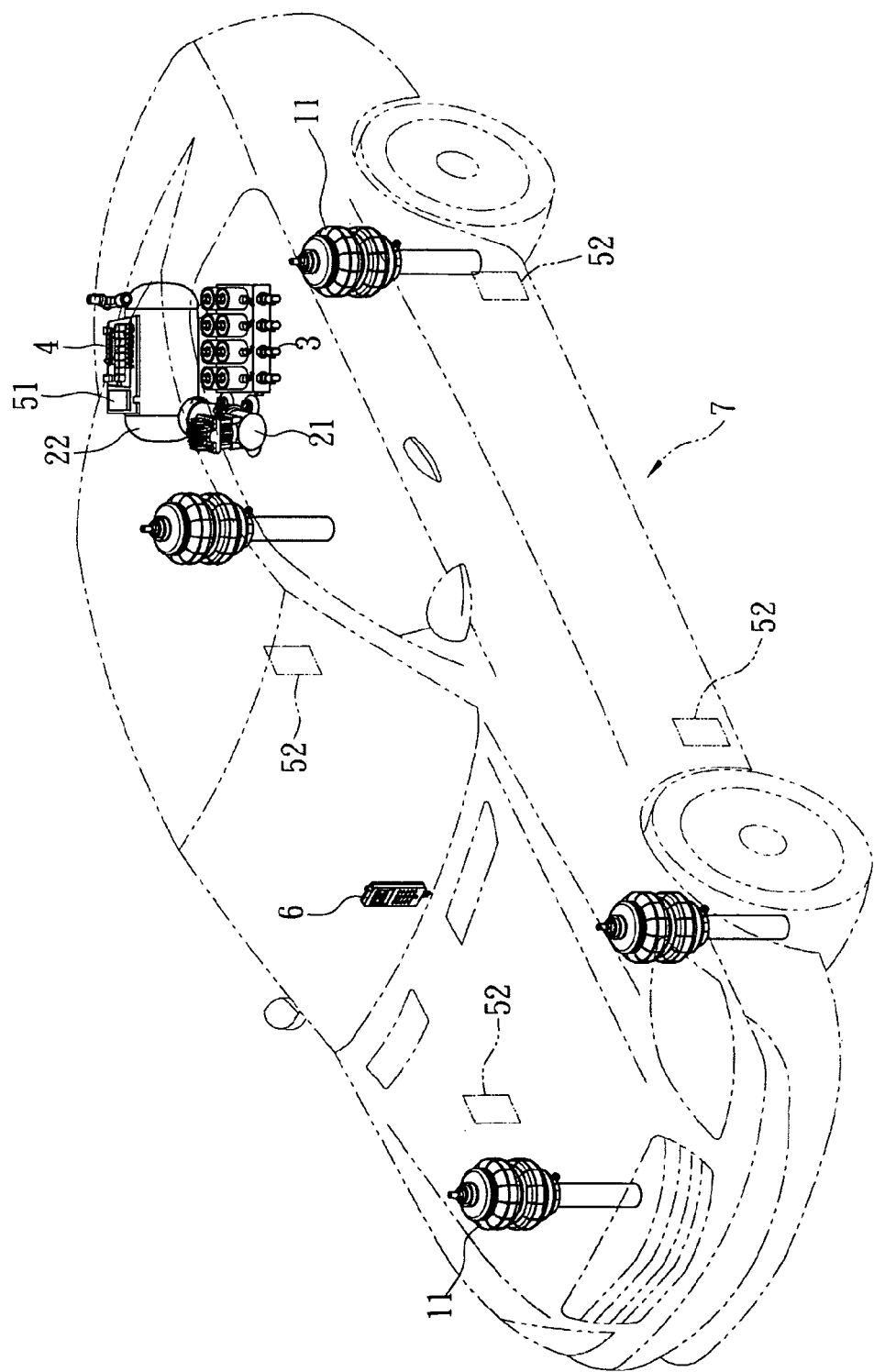
FIG. 6 is a schematic view of entire disclosed system installed on a vehicle.

Please refer to FIG. 6, which is a schematic view of the disclosed system installed in a vehicle 7. The drawing shows where the disclosed intelligent electronic air suspension system that automatically adjusts its air pressure is installed in the vehicle. The four air struts are disposed at the four corners of the vehicle suspension system. The control end 4, the air compressor 21, the air storage tank 22, and the EM valve assembly 3 are installed in the trunk. The monitor end 6 can be disposed in front of the driver's seat and on a support for the driver to monitor and operate.

More explicitly, the air struts used in the invention mainly use the reaction of the compressed air in the rubber air bag therein to produce an elastic effect. They are mounted on the vehicle to replace the conventional spiral springs made of steel. In comparison with the conventional metal springs, the invention has the following advantages:

a. By inflating and deflating the air spring, the spring constant K can be arbitrarily changed. With the use of dampers with a variable damping value (CIT), the riding comfort can be greatly improved.

b. The springs are basically nonlinear. It is easier to select the desired ones.

c. The spring constant is proportional to the air pressure, with no dependence on the loaded weight. The intrinsic vibrations are roughly fixed. Therefore, it is very comfortable to ride the vehicle.

d. The vehicle height adjusting mechanism can be conveniently assembled. The vehicle height can be maintained or arbitrarily adjusted for any loaded weight.

In summary, the invention includes the vehicle speed detector, the level detector (optional), the vehicle height detector, the pressure sensor, and the air struts. Each of the air struts can actively adjust itself according to the current road condition and vehicle state. It provides more comfort to the driver and passengers. Alternatively, it provides better controllability according to user's habits.

For trucks and commercial vans that have heavier loads, the disclosed technique can make suitable adjustments on the heights of air struts if the load is unevenly distributed, so that the vehicle is kept level. The air struts thus have a longer lifetime. The vehicle body also has less direct collisions and damages.

Figure 7:
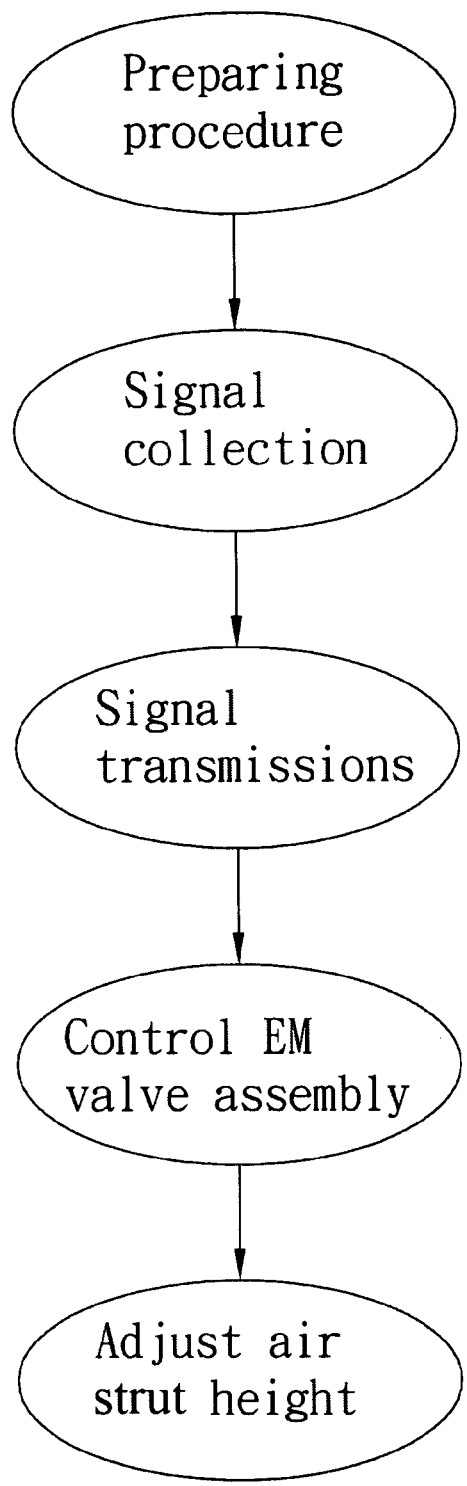
FIG. 7 is a schematic view showing how to operate the invention.

Please refer to FIG. 7 for the operating method of the disclosed intelligent electronic air suspension system that automatically adjusts its air pressure. Please also refer to FIGS. 8 and 9 that show the flowcharts of the control end and the monitor end, respectively. The disclosed method includes the following steps.

Preparation. This step prepares a control end 4 and a monitor end 6 so that they can transmit signals between each other.

Signal collection. The control end 4 controls a vehicle speed detector 51 to detect the vehicle speed, a level detector 53 to detect the vehicle level, a vehicle height detector 52 to detect the vehicle height, and four first pressure sensors 12 to detect the interior pressure of the four air struts 11.

Signal transmissions. The detected data of vehicle speed, level, height, and pressure are transmitted to the monitor end 6. After decoding, they are displayed on the display 64 of the monitor end 6.

Controlling the EM valve assembly 3. The appropriate heights of the air struts 11 are either manually put in via the buttons 62 on the monitor end 6 or automatically computed by the second micro controller 61. The adjusting data are encoded and transmitted to the control end 4. Of course, the relevant data can be manually set in advance and stored in memory for the user to use in the future according to needs.

Adjusting the height of each air strut 11. The control end 4 decodes the signal and follows the decoded message to control the in valve 35 and the out valve 36 of the corresponding air strut 11. Each of the air strut 11 is thus inflated or deflated to change its height.

According to the above-mentioned operating method of the disclosed suspension system, the user can browse the current state of the vehicle and road conditions from the monitor end, in addition to obtaining the data from various sensors. The user is allowed to manually adjust or let the monitor end 6 or the control end 4 to automatically adjust the inflation and deflation of each of the air struts.

Of course, normally it is most convenient for the control end 4 to directly detect, collect and set relevant parameters. If the driver has some special habits, the settings can be manually adjusted.

Figure 8:
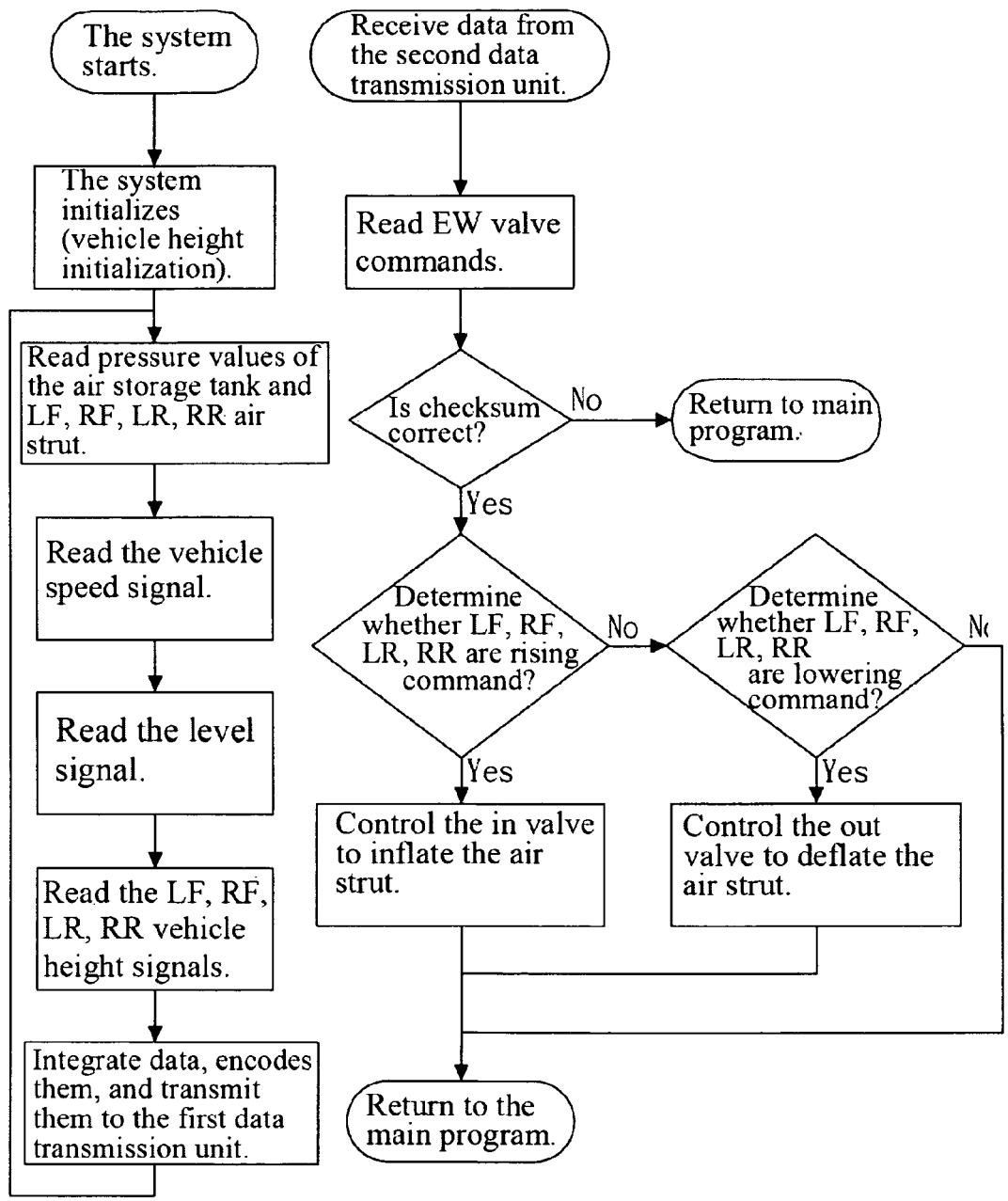
FIG. 8 is a flowchart of the control end in the invention.

As shown in FIG. 8, the system performs initialization settings when it starts. These include wireless module initialization, vehicle height adjustment initialization, etc. After the initializations, the sensor information is continuously read out, including the pressure values of the four pressure sensors, vehicle speed signal, level signal, and signals of four height sensors. These data are integrated, coded, and transmitted to the first transmission unit. The data received by the second data transmission unit are performed with a checksum check to determine whether the data are correct. Afterwards, inflation or deflation commands are sent to the four air springs to adjust their heights. This prevents possible errors due to mistakes in the height signal reception.

Figure 9:
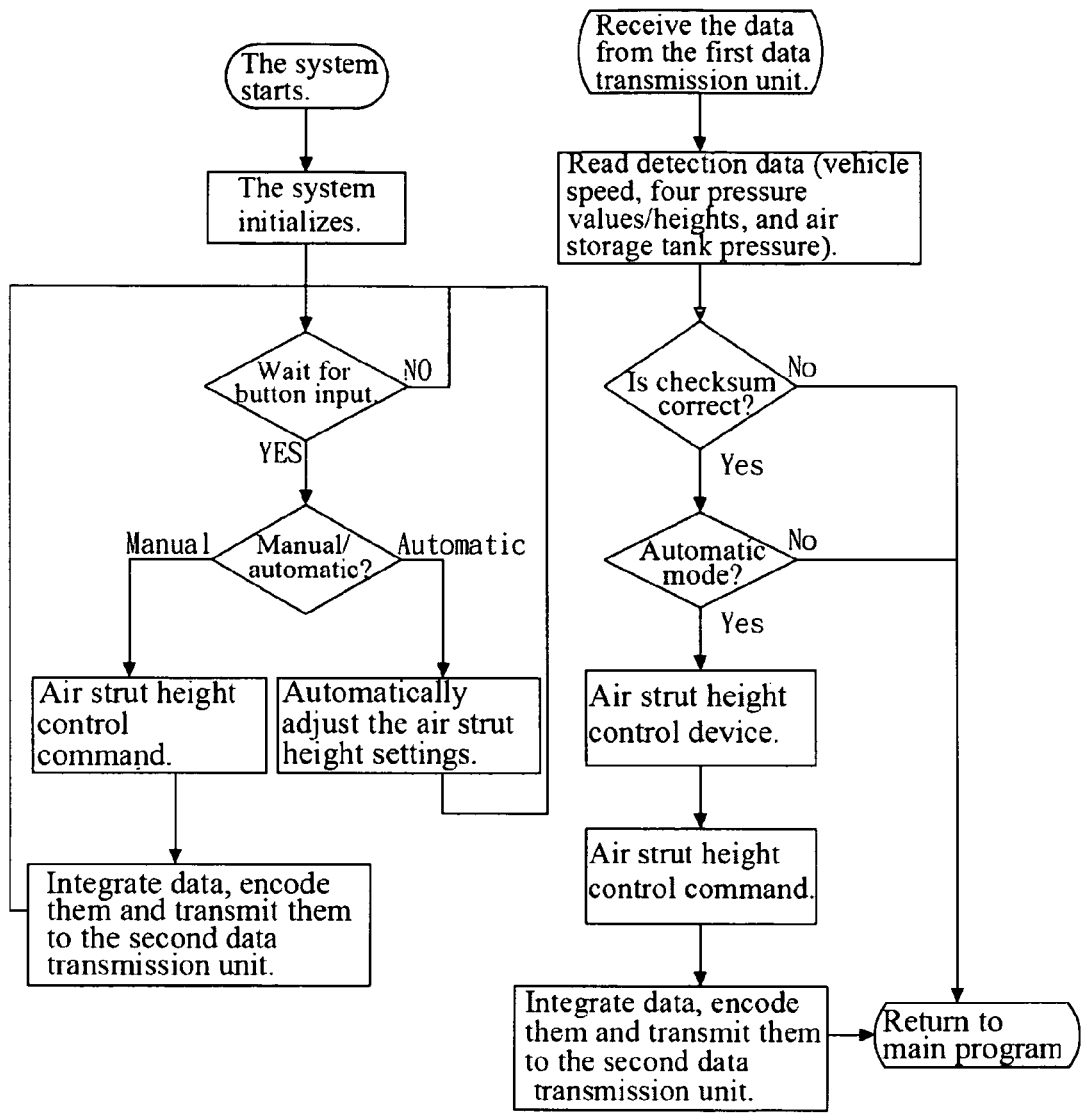
FIG. 9 is a flowchart of the monitor end in the invention.

As shown in FIG. 9, the system performs initialization settings when it starts. These include wireless module initialization, LCD (display) initialization, etc. Afterwards, the system waits for button settings. If it is set in the manual mode, then the system follows the buttons pressed by the user to control the inflation and deflation of each of the air springs. On the other hand, if it is set in the auto mode, then the obtained vehicle information is sued to determine the best states of the air springs. At the same time, the LCD display shows the vehicle information at all times.

Although the invention has been described with reference to specific embodiments, this description is not meant to be construed in a limiting sense. Various modifications of the disclosed embodiments, as well as alternative embodiments, will be apparent to people skilled in the art. Therefore, it is contemplated that the appended claims will cover all modifications that fall within the true scope of the invention.

What is claimed is:

1. An intelligent electronic air suspension system that automatically adjust its air pressure, which comprises:

four air struts, disposed in the left front, right front, left rear, and right rear of the suspension system of a vehicle;

one air compressor, which is disposed in the vehicle and connected with an air storage tank;

one electromagnetic (EM) valve assembly, which is disposed in the vehicle and includes first, second, third, and fourth EM valves; wherein each of the first, second, third, and fourth EM valves has an in valve and an out valve for the air storage tank to inflate or deflate the four air struts, the EM valves are connected with a first pressure sensor, respectively, and the four first pressure sensors are in fluid communications with the four air struts for measuring their air pressure values;

one control end, which electrically connects to the EM valve assembly, includes a first micro controller and a first data transmission unit, and electrically connects to each of the first pressure sensors;

at least one vehicle speed detector, which is disposed in the vehicle and electrically connected with the control end for detecting the speed of the vehicle;

at least one vehicle height detector, which is disposed in the vehicle and electrically connected with the control end for detecting the height of the vehicle; and one monitor end with signal transmissions with the control end, which includes a second micro controller, a plurality of buttons, a second data transmission unit, and a display; wherein the buttons are used to adjust the air struts in the left front, right front, left rear, and right rear of the vehicle, the second data transmission unit and the first data transmission unit exchange signals, and the monitor end receives the vehicle speed, vehicle height, and pressure data measured by the above-mentioned detectors, decodes the data and displays the data on the display;

wherein the most appropriate height of each of the air struts is either entered manually via the buttons or automatically computed by the second micro controller on the monitor end; the adjustment data are coded and transmitted to the control end to control the EM valve assembly; after decoding the message, the control end controls the corresponding in and out valve of the air struts accordingly to inflate or deflate the air struts, thereby changing the height of each of the air struts.

2. The intelligent electronic air suspension system that automatically adjusts its air pressure according to claim 1, wherein the vehicle speed detector is implemented using the speed function of a satellite positioning system.

3. The intelligent electronic air suspension system that automatically adjust its air pressure according to claim 1, wherein the vehicle speed detector is a magnetic resistance element sensor installed on the drive gear in the gearbox.

4. The intelligent electronic air suspension system that automatically adjust its air pressure according to claim 1, wherein the vehicle height detector is a non-contact sensor, such as an ultrasonic, infrared or laser sensor.

5. The intelligent electronic air suspension system that automatically adjust its air pressure according to claim 1, wherein the vehicle height detector is a contact slide resistance sensor.

6. The intelligent electronic air suspension system that automatically adjusts its air pressure according to claim 1, wherein the control end electrically connects to a level sensor disposed in the vehicle.

7. The intelligent electronic air suspension system that automatically adjust its air pressure according to claim 6, wherein the level sensor is a piezo resistance sensor or electrostatic capacitor sensor.

8. The intelligent electronic air suspension system that automatically adjust its air pressure according to claim 1, wherein the air storage tank has a second pressure sensor.

9. The intelligent electronic air suspension system that automatically adjust its air pressure according to claim 1, wherein the first and second data transmission units exchange data using a wireless transmission technique, which uses radio frequency or Bluetooth technology.

10. The intelligent electronic air suspension system that automatically adjust its air pressure according to claim 1, wherein the first and second data transmission units exchange data using a wired transmission technique.

* * * * *